United States Patent Office 3,203,978
Patented Aug. 31, 1965

3,203,978
PROCESS FOR PREPARING THE METHYL ESTER
OF 2,5-HEXADIENOIC ACID
Gian Paolo Chiusoli, Novara, and Sergio Merzoni, Milan,
 Italy, assignors to Montecatini Societá Generale per
 l'Industria Mineraria e Chimica, Milan, Italy, a corporation of Italy
No Drawing. Filed June 6, 1962, Ser. No. 200,328
Claims priority, application Italy, June 6, 1961,
10,255/61
3 Claims. (Cl. 260—486)

This invention relates to a process for preparing 2,5-methyl hexadienoate, i.e., methyl ester of 2,5-hexadienoic acid. In particular, the process comprises reacting methyl allyl ether with acetylene, carbon monoxide, nickel carbonyl, methyl alcohol and hydrochloric acid.

Our previous patents describe the preparation of 2,5-methyl hexadienoate, at room temperature and under atmospheric pressure, from allyl chloride, acetylene, carbon monoxide, nickel carbonyl and methyl alcohol. The reaction is partially catalytic and can be represented by the following reaction scheme:

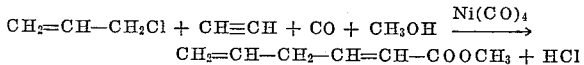

$$CH_2=CH-CH_2Cl + CH\equiv CH + CO + CH_3OH \xrightarrow{Ni(CO)_4}$$
$$CH_2=CH-CH_2-CH=CH-COOCH_3 + HCl$$

It is possible that nickel carbonyl is transformed into an intermediate hexadienoyl-carbonylic complex, which is decomposed or split by the action of methyl alcohol, freeing a molecule of methyl hexadienoate. This makes possible the coordination of a new molecule of allyl chloride, and consequently of carbon monoxide and acetylene, while the complex is regenerated. This is indicated schematically as follows:

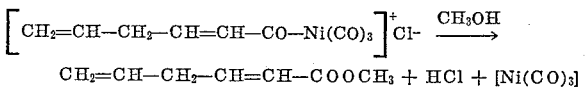

$$\left[CH_2=CH-CH_2-CH=CH-CO-Ni(CO)_3\right]^+ Cl^- \xrightarrow{CH_3OH}$$
$$CH_2=CH-CH_2-CH=CH-COOCH_3 + HCl + [Ni(CO)_3]$$

According to this interpretation, the intermediate complex, and consequently the nickel carbonyl, should act merely as a catalyst. In practice, a certain amount of nickel carbonyl is decomposed, nickel chloride being formed by side reactions, principally by the following condensation reaction:

$$2CH_2=CH-CH_2Cl + Ni(CO)_4 \rightarrow$$
$$CH_2=CH-CH_2-CH_2-CH=CH_2 + NiCl_2 + 4CO$$

The yield decreases accordingly and, in order to increase it, it is necessary to operate in dilute solution. However, even in dilute methanol, the consumption of nickel carbonyl remains rather high, that is, about 0.35 mole per mole of hexadienoate, when the yield is about 60%. Furthermore, the space taken up in the reactor is considerable, the productivity being reduced.

The applicants have found, surprisingly, that it is possible to avoid the above-mentioned disadvantages, by adding—to a mixture of methyl allyl ether, acetylene, carbon monoxide, nickel carbonyl and methyl alcohol—small amounts of hydrochloric acid, in accordance with the following overall equation, the catalytic character of which is made evident:

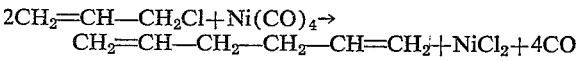

$$CH_2=CH-CH_2-OCH_3 + CH\equiv CH + CO \xrightarrow[CH_3OH]{Ni(CO)_4, HCl}$$
$$CH_2=CH-CH_2-CH=CH-COOCH_3$$

The new method, which at first sight may appear to be equivalent to the above-mentioned method, has, on the contrary, a number of advantageous characteristics which make it clearly preferable. The nickel carbonyl consumption diminished to about ⅓, and the yield is increased to a marked degree, namely up to over 85%.

Furthermore, since the concentration of the chloro derivatives in the reaction mixture is very small, satisfactory dilution is obtained with only small amounts of methyl alcohol. As a consequence, the productivity is increased more than six times. The hydrochloric acid which has been added and which should form allyl chloride from the methyl allyl ether, probably does not act directly on the methyl allyl ether, but acts on a complex of methyl allyl ether with nickel carbonyl and carbon monoxide.

In this way, the allyl group is allowed to react with acetylene under the best conditions, and the catalytic complex has a longer life. The hydrochloric acid, which acts on the allyl complex, is continuously formed through the decomposition of the same allyl complex and, therefore, it also works catalytically. Only the part which is transformed into nickel chloride has to be replaced.

Alternatively, instead of hydrochloric acid, allyl chloride may be used, which serves to initiate the reaction by producing a certain amount of hydrochloric acid, which then reacts according to the above-described method.

However, the novelty of the process carried out according to the present invention is in no way limited by the above-stated theoretical interpretation of its course, and of the reactions which take place.

The applicants have found that the most suitable ranges in which the variables of the reaction can vary are the following: molar ratio of methyl allyl ether to hydrochloric acid or allyl chloride, from 1 to 10; molar ratio between carbon monoxide and acetylene, from 0.5 to 1; molar ratio betwen nickel carbonyl and allyl chloride or hydrochloric acid, from 0.5 to 1.5; temperatures between 20° and 60° C., preferably between 30° and 40° C.

The dilution of the mixture is preferably adjusted in such a manner that the molar ratio between methyl alcohol plus methyl allyl ether and hydrochloric acid or allyl chloride is higher than 10. The methyl alcohol is preferably added in amounts ranging from 1 to 10 mols per mol of methyl allyl ether.

The product of the synthesis is the 2,5-methyl hexadienoate, prevailingly in the cis form. It can be accompanied by small amounts of the isomers 3,5 and 2,4, which, however, are useful products, since the main use of the hexadienoate thus obtained involves the isomerization and then, the saponification of sorbic acid, a useful intermediate for preparing resins and fibers. Small quantities of methyl acrylate are also formed. The execution of the synthesis is in actual practice very simple. Methyl alcohol and methyl allyl ether are introduced into a reaction vessel into which a stream of carbon monoxide and acetylene is allowed to flow, while allyl chloride or hydrochloric acid are gradually introduced, at the same time as the nickel carbonyl. The solution takes on a color shade ranging from reddish to brown, heat being evolved.

After introducing the reactants, the solution is kept still under the stream of carbon monoxide and acetylene, and then water is added. Separation and distillation of the upper layer produces tops containing nickel carbonyl and methyl allyl ether, which are recycled, and also methyl hexadienoate.

The process is illustrated by the following examples, which however are not intended to limit the claimed invention.

*Example 1*

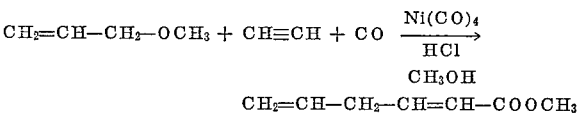

100 ml. methyl alcohol and 100 g. methyl allyl ether are introduced into a 500 ml. five-necked flask, provided with a mechanical stirrer, and a reflux cooler kept at —20° C., and also a gas inlet, a separator funnel and thermometer. A stream of 30 liters per hour of carbon monoxide and acetylene gas mixture in a 1:1 ratio is passed into the flask, the temperature being raised to 35–40° C. Six grams of hydrochloric acid together with 20 ml. nickel carbonyl in 150 ml. methyl alcohol solution are then introduced through the separator funnel over a 90 minute period.

The gas is passed in for a further half hour. 700 ml. water are added to the solution and the upper layer is then separated.

The lower layer is distilled to recover a part of the methyl allyl ether and the methyl alcohol for the recycling and also a small amount of methyl hexadienoate which is removed with the upper layer.

After the distillation of the tops containing nickel carbonyl and unreacted methyl allyl ether, 77 g. of 2,5-methyl hexadienoate are distilled off at 63–66° C. under 33 mm. Hg, 5 g. remaining as residue. The aqueous layer contains 4.9 g. nickel as nickel chloride.

*Example 2*

100 ml. methyl alcohol and 72 g. methyl allyl ether are introduced into the flask of the preceding example. A stream of gas consisting of $C_2H_2$ and CO in 1:1 ratio is passed into the flask at a rate of 30 liters per hour while the temperature is raised to 35° C. 10 grams of allyl chloride and 20 ml. nickel carbonyl, both diluted in 50 ml. methyl alcohol, are introduced at the same time, over a period of 90 minutes, through two separatory funnels joined together. The gas is introduced for a further half hour; 700 ml. water are added to the solution and the upper layer is separated.

The lower layer is distilled off, to recover part of the methyl allyl ether and to recover the methyl alcohol for recycling, and also a certain amount of the methyl hexadienoate, which is removed together with the upper layer, the upper layer being then distilled.

The tops containing nickel carbonyl and methyl allyl ether are at first removed.

80 grams of 2,5-methyl hexadienoate are obtained at 63–66° C. under 33 mm. Hg, 4 grams remaining as residue.

The lower layer contains 5.25 g. nickel as nickel chloride.

Examples 1 and 2 can be carried out at atmospheric pressure or sub-atmospheric pressure or at pressures higher than atmospheric.

We claim:
1. A process for preparing methyl ester of 2,5-hexadienoic acid,, comprising reacting methyl allyl ether, acetylene and carbon monoxide in the presence of nickel carbonyl, methyl alcohol and hydrochloric acid in the molar ratios: methyl allyl ether:hydrochloric acid from 1 to 10; carbon monoxide:acetylene from 0.5 to 1; nickel carbonyl:hydrochloric acid from 0.5 to 1 at a temperature between 20° and 60° C.

2. A process for preparing methyl ester of 2,5-hexadienoic acid,, comprising reacting methyl allyl ether, acetylene and carbon monoxide in the presence of nickel carbonyl, methyl alcohol and allyl chloride in the molar ratios: methyl allyl ether:allyl chloride from 1 to 10; carbon monoxide:acetylene from 0.5 to 1; nickel carbonyl:allyl chloride from 0.5 to 7 at a temperature between 20° and 60° C.

3. The process of claim 2, the hydrochloric acid being supplied at least in part by allyl chloride.

References Cited by the Examiner

UNITED STATES PATENTS

| | | | |
|---|---|---|---|
| 2,015,706 | 10/35 | Brooks | 260—657 X |
| 2,210,564 | 8/40 | Andrussow | 260—657 X |
| 3,032,583 | 5/62 | Chiusoli | 260—486 |
| 3,110,725 | 11/63 | Chiusoli | 260—486 X |

OTHER REFERENCES

Wagner, Synthetic Organic Chemistry, pp. 88–93 (1953).

LORRAINE A. WEINBERGER, *Primary Examiner.*

LEON ZITVER, *Examiner.*